US011858263B2

(12) United States Patent
Yamasaki

(10) Patent No.: US 11,858,263 B2
(45) Date of Patent: Jan. 2, 2024

(54) PRINTING DEVICE, CONTROL METHOD FOR PRINTING DEVICE, AND STORAGE MEDIUM

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/075,248

(22) Filed: Dec. 5, 2022

(65) Prior Publication Data

US 2023/0115332 A1 Apr. 13, 2023

Related U.S. Application Data

(63) Continuation of application No. 17/319,731, filed on May 13, 2021, now Pat. No. 11,541,655.

(30) Foreign Application Priority Data

May 14, 2020 (JP) ................................ 2020-084834
Jan. 5, 2021 (JP) ................................ 2021-000535

(51) Int. Cl.
*B41J 2/045* (2006.01)

(52) U.S. Cl.
CPC ....... *B41J 2/04508* (2013.01); *B41J 2/04586* (2013.01)

(58) Field of Classification Search
CPC ..... B41J 3/407; B41J 2/04586; B41J 2/04508
See application file for complete search history.

(56) References Cited

U.S. PATENT DOCUMENTS 10,384,483 B2 8/2019 Kasahara
2012/0103210 A1* 5/2012 Hashimoto .............. B41J 3/407 101/35

FOREIGN PATENT DOCUMENTS

CN 105313458 A 2/2016
JP 2003-534083 A 11/2003
JP 2016-10856 A 1/2016

OTHER PUBLICATIONS

JPO; Application No. 2021-000535; Notice of Reasons for Refusal dated Aug. 2, 2022.
CNIPA; Application No. 202110519730.2; First Office Action dated Jun. 30, 2022.

* cited by examiner

*Primary Examiner* — Thinh H Nguyen
(74) *Attorney, Agent, or Firm* — Fitch, Even, Tabin & Flannery LLP

(57) ABSTRACT

Disclosed is a printing device including at least one processor and a print head. The processor detects a nail region based on an image obtained by photographing a finger or a toe, sets at least a part of the detected nail region as a preceding print setting region, detects a region on which the preceding print is printed as a succeeding print region based on an image obtained by photographing the finger or the toe on which the preceding print is printed, sets a succeeding print region reference point corresponding to the succeeding print region, or sets a preceding print setting region reference point corresponding to the preceding print setting region and the succeeding print region reference point, and causes the print head to print a succeeding print on the nail region based on information on the preceding print setting region and a reference point that is set.

13 Claims, 10 Drawing Sheets

PRINTING DEVICE, CONTROL METHOD FOR PRINTING DEVICE, AND STORAGE MEDIUM

CROSS-REFERENCE TO RELATED APPLICATION

This application is a continuation of prior U.S. application Ser. No. 17/319,731, filed on May 13, 2021, which is based upon and claims the benefit of priority from the prior Japanese Patent Applications No. 2020-084834, filed on May 14, 2020 and No. 2021-000535, filed on Jan. 5, 2021, the disclosures of which, including descriptions, claims, abstracts and drawings, are incorporated herein by reference in their entirety.

BACKGROUND

Technical Field

The present disclosure relates to a printing device, a control method for the printing device, and a storage medium.

Description of Related Art

Conventionally, there are known printing devices (nail printing devices) that print nail designs on person's fingernails, toenails and the like (for example, see JP 2003-534083 A).

In this type of printing device, background printing is performed on the nail with a white ink or the like in advance, and color printing (design printing) is performed with color inks in some cases. In such cases, after the background printing, the finger is once removed from the device in order to dry the white ink, apply an accepting layer for color inks and the like. Then, the finger is set in the device again, the background region is recognized by a camera, and the color printing is performed within the background region.

SUMMARY

According to an aspect of the present disclosure, there is provided a printing device including: at least one processor; and a print head that prints a preceding print, wherein the processor detects a nail region based on an image obtained by photographing a finger or a toe that is a printing target, sets at least a part of the detected nail region as a preceding print setting region on which the preceding print is to be printed, detects a region on which the preceding print is printed by the print head as a succeeding print region based on an image obtained by photographing the finger or the toe which is the printing target and on which the preceding print is printed by the print head, sets a succeeding print region reference point corresponding to the succeeding print region, or sets a preceding print setting region reference point corresponding to the preceding print setting region and the succeeding print region reference point, and causes the print head to print a succeeding print on the nail region based on information on the preceding print setting region and a reference point that is set among the succeeding print region reference point and the preceding print setting region reference point.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DETAILED DESCRIPTION OF EMBODIMENTS

An embodiment of a printing device according to the present disclosure will be described with reference to FIGS. 1 to 11.

The embodiment described below is provided with various limitations technically preferable for carrying out the present disclosure. However, the scope of the present disclosure is not limited to the embodiment below or illustrated examples.

Furthermore, in the following embodiment, a case where the printing device is a nail printing device that performs printing on fingernail(s) (including thumbnail(s)) of hand(s) as a printing target will be described as an example. However, the printing target of the printing device in the present disclosure is not limited to the fingernail(s) or the thumbnail(s) of hand(s). For example, toenail(s) of foot (feet) may be the printing target. The printing target may also be targets other than nails, such as nail tips and surfaces of various accessories.

Figure 1:
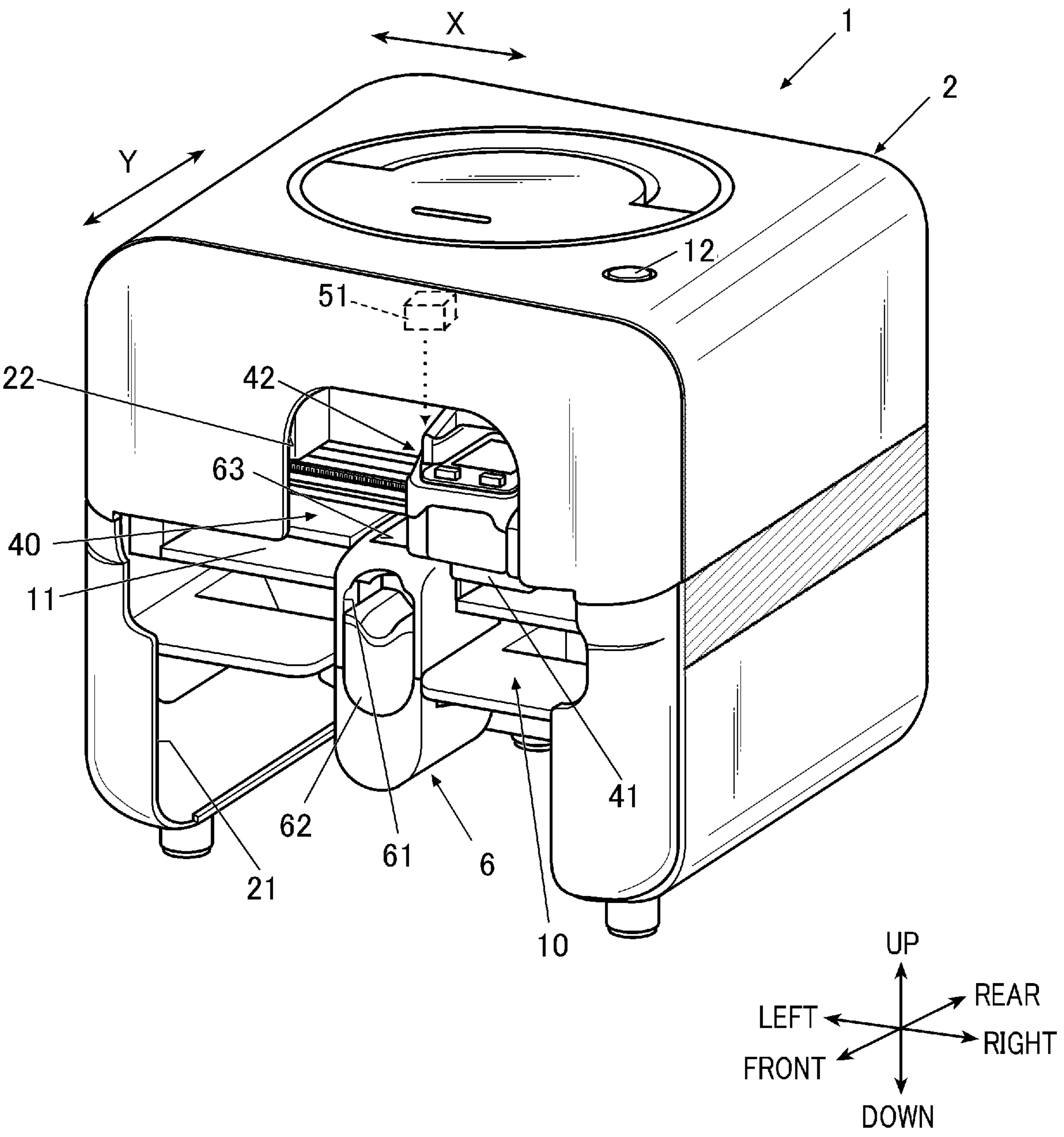
FIG. 1 is a main part perspective view showing the internal configuration of a nail printing device in an embodiment.

FIG. 1 is a perspective view showing the main part outer configuration of a nail printing device 1.

In the following embodiment, the up, down, left, right, front and rear refer to the directions shown in FIG. 1. Furthermore, the X direction and the Y direction respectively refer to the left-right direction and the front-rear direction.

As shown in FIG. 1, the nail printing device 1 includes a housing 2 which is formed in a nearly box shape.

The housing 2 includes an opening 21 which is formed over the nearly entire surface in the left-right direction (horizontal direction of nail printing device 1, left-right direction in FIG. 1, X direction) in the lower section on the front surface side (front surface side of nail printing device 1, front side in FIG. 1). There is a cut-off portion 22 continuing to the upper side of the opening 21, in the nearly central portion in the left-right direction of the housing 2. The cut-off portion 22 functions as a port when an after-mentioned print head 41 is attached to and detached from the device.

Though not shown in the drawings, the housing 2 may include a cover member or the like which covers the opening 21 and the cut-off portion 22. The cover member may be a separate member from the housing 2, or may be attached to the housing 2 via a hinge or the like in an openable and closable manner, for example.

An operation unit 12 of the nail printing device 1 is provided on the upper surface (top plate) of the housing 2. The operation unit 12 is an operation button (power switch button) to turn on/off the power of the nail printing device 1, for example. When the operation unit 12 is operated, the operation signal is output to an after-mentioned control device 80, and the control device 80 performs control in accordance with the operation signal to operate the components of the nail printing device 1. For example, when the operation unit 12 is a power switch button, the power of the nail printing device 1 is turned on/off according to the button operation.

The components of the nail printing device 1 may operate in accordance with the operation signal which was input from an operation unit 91 of an after-mentioned control device 9 instead of the operation unit 12.

The shapes, arrangement and the like of the components in the housing 2 are not limited to the illustrated examples, and can be set as needed. For example, the operation unit 12 may be provided on a lateral surface, a back surface or the like, not on the upper surface of the housing 2. The housing 2 may have other various operation buttons as the operation unit 12, and may have various displays, indicators and the like.

A device body 10 is contained inside the housing 2.

The device body 10 includes a base 11, a printing unit and a finger fixing unit 6 attached to the base 11, for example.

The finger fixing unit 6 is arranged in the nearly central portion in the left-right direction (X direction) on the device front surface side in the base 11. The finger fixing unit 6 fixes, in the region suitable for the printing, the finger (printing finger) having the nail which is the printing target in the present embodiment.

The finger fixing unit 6 has an opening 61 on the device front surface side. A finger fixing member 62 is provided inside the finger fixing unit 6. The finger fixing member 62 presses up and supports the finger inserted from the opening 61 from the lower side. The finger fixing member 62 is formed of a resin or the like having flexibility, for example.

The upper surface of the finger fixing unit 6 has a window 63 to expose the nail portion of the finger which was inserted from the opening 61 and is held by the finger fixing member 62.

The printing unit 40 is a printing unit that performs printing on the nail which is the printing target.

Figure 2:
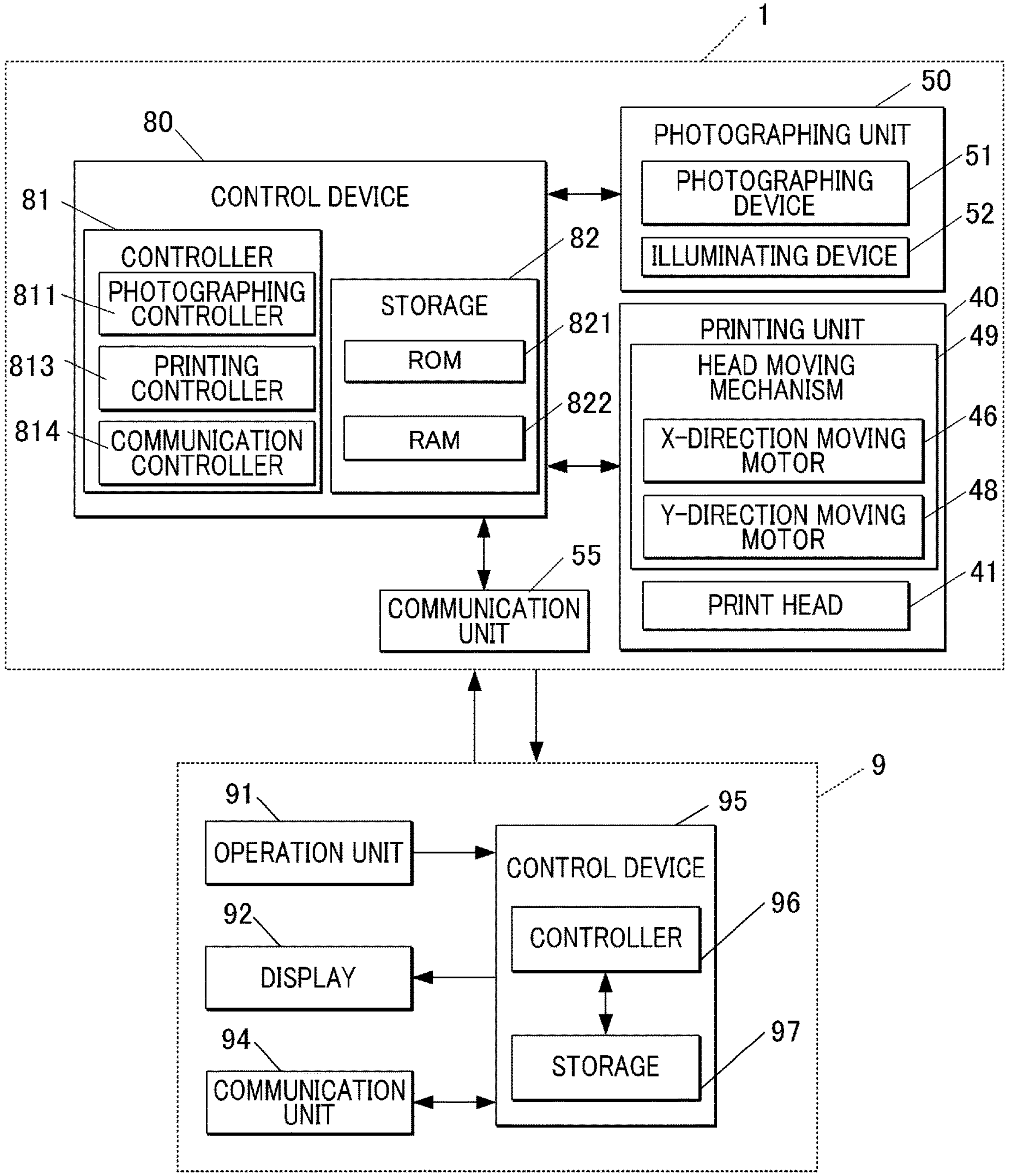
FIG. 2 is a control block diagram showing a schematic control configuration of the nail printing device and a terminal device in the embodiment.

The printing unit 40 includes a print head 41 that performs the printing operation, and a head moving mechanism 49 for moving a print head unit 42 including the print head 41 (see FIG. 2).

In the print head 41 of the present embodiment, the surface facing the nail surface is the ink ejection surface including multiple nozzle tips (none of them shown in the drawings) to eject ink. The print head 41 is an inkjet type inkjet head that performs printing by making micro droplets of ink and directly spraying, from the ink ejection surface, the ink onto the nail surface which is the printing surface of the printing target (nail). Though the configuration of the print head 41 is not especially limited, the print head 41 is a cartridge-integrated head which has the ejection mechanism section such as the ink ejection surface integrated with the ink cartridge (none of them shown in the drawings), for example.

For example, the print head 41 can eject inks of C (CYAN), M (MAGENTA), and Y (YELLOW). The print head 41 in the present embodiment can also eject the ink of white color as the background paint. By printing a white color background, it is possible to make the colors appear well since the background color greatly influences the color tint in the inkjet printing. The type of inks included in the print head 41 is not limited to the above type.

The head moving mechanism 49 is configured by including an X-direction moving mechanism (not shown in the drawings) for moving the print head 41 in the left-right direction (X direction) of the device, and a Y-direction moving mechanism (not shown in the drawings) for moving the print head 41 in the front-rear direction (Y direction) of the device.

The X-direction moving mechanism includes an X-direction moving motor 46 (see FIG. 2), and moves the print head 41 in the left-right direction (X direction) of the device by the X-direction moving motor 46 driving. The Y-direction moving mechanism includes a Y-direction moving motor 48 (see FIG. 2), and moves the print head 41 in the front-rear direction (Y direction) of the device by the Y-direction moving motor 48 driving.

At a position above the window 63 of the finger fixing unit 6 inside the upper surface (top plate) of the housing 2, there is provided a photographing unit 50 that photographs the nail (finger including the nail) exposed from the window 63 and obtains an image of the nail (image of the finger including the nail, hereinafter, referred to as a "nail image").

The photographing unit 50 includes a photographing device 51 such as a camera and an illuminating device 52 which illuminates the nail that is the photographing target and includes a white LED, for example (see FIG. 2).

The photographing device 51 is, for example, a small-sized camera configured by including a CCD (Charge Coupled Device) type or CMOS (Complementary Metal Oxide Semiconductor) type solid imaging element which has approximately two million pixels or more and a lens. The photographing device 51 includes an optical axis Ax along the up-down direction orthogonal to the X-Y plane. A size alignment is adjusted to accurately obtain the size of an object from the image capturing the object that is located on a reference plane L which is at a predetermined distance (see FIGS. 4A and 4B). The position of the optical axis Ax on the X-Y plane is fixed, and has the coordinates (CX, CY) in the present embodiment.

The present embodiment takes, as an example, a case where the photographing device 51 and the illuminating device 52 are arranged to be fixed at positions capable of facing the nail (nail surface) of the finger placed in the finger fixing unit 6 on the inner side of the top plate of the housing 2. However, the specific arrangement is not particularly limited as long as the photographing unit 50 is provided at a position capable of photographing the nail of the finger placed in the finger fixing unit 6.

For example, the photographing unit 50 may be configured to be movable in the X-Y direction by the head moving mechanism 49 that moves the print head 41.

FIG. 2 is a control block diagram showing the schematic control configuration of the nail printing device 1 and an after-mentioned terminal device 9.

As shown in FIG. 2, the nail printing device 1 includes a communication unit 55 and a control device 80, in addition to the printing unit 40 and the photographing unit 50 described above.

The communication unit 55 is configured to be able to transmit and receive information to and from the after-mentioned terminal device 9 that operates in cooperation with the nail printing device 1.

The communication between the nail printing device 1 and the terminal device 9 is performed by, for example, a wireless LAN. The communication between the nail printing device 1 and the terminal device 9 is not limited to this, and any method may be used. For example, a network line such as the Internet may be used, or wireless communication based on a near field wireless communication standard such as Bluetooth (registered trademark) or Wi-Fi may be performed. Furthermore, this communication is not limited to wireless communication, and various types of data may be transmitted and received between the nail printing device 1 and the terminal device 9 by wired connection. The communication unit 55 includes an antenna chip or the like corresponding to the communication method of the terminal device 9.

The control device 80 is a computer that includes: a controller 81 configured by including a CPU (Central Processing Unit) not shown in the drawings; and a storage 82 configured by including a ROM (Read Only Memory) 821, a RAM (Random Access Memory) 822, and the like.

The storage 82 stores various programs and various types of data for operating the nail printing device 1.

Specifically, the ROM 821 of the storage 82 stores various programs such as a printing program for performing printing processing, for example. These programs are executed by the control device 80. Thereby, the components of the nail printing device 1 are controlled in an integrated manner.

The controller 81 includes functional sections such as a photographing controller 811, a printing controller 813, and a communication controller 814. The functions of these respective functional sections are realized by the cooperation of the CPU of the controller 81 and the program stored in the ROM 821 of the storage 82.

The photographing controller 811 controls the photographing device 51 and the illuminating device 52 of the photographing unit 50, and causes the photographing device 51 to photograph an image of the finger (nail image) including an image of the nail of the printing finger fixed to the finger fixing unit 6.

The image data of the nail image acquired by the photographing unit 50 is transmitted to the after-mentioned terminal device 9 via the communication unit 55. The image data may be stored in the storage 82.

The printing controller 813 outputs a control signal to the printing unit 40 on the basis of printing data transmitted from the terminal device 9, and controls the X-direction moving motor 46 and the Y-direction moving motor 48, the print head 41, and the like of the printing unit 40 so as to perform printing on the nail according to the printing data.

The communication controller 814 controls the operation of the communication unit 55. In the present embodiment, the communication controller 814 controls communication with the terminal device 9, to receive printing data or the like when the printing data or the like is transmitted from the terminal device 9.

The nail printing device 1 in the present embodiment is configured to be able to communicate with the terminal device 9, and executes the printing operation and the like on the basis of the operation instruction from the terminal device 9.

The terminal device 9 is, for example, a mobile terminal such as a smartphone or a tablet. However, the terminal device 9 is not particularly limited as long as the terminal device 9 can communicate with the nail printing device 1. For example, the terminal device 9 may be a notebook or stationary personal computer, a terminal device for a game, or the like.

Specifically, the terminal device 9 includes an operation unit 91, a display 92, a communication unit 94, a control device 95, and the like.

The operation unit 91 can perform various inputs and settings according to user operations. When the operation unit 91 is operated, an input signal corresponding to the operation is transmitted to the control device 95. In the present embodiment, a touch panel is integrally provided on the surface of the display 92, and the user can perform various input/setting operations and the like by touch operations on the touch panel.

The operation unit 91 for performing various input/setting operations and the like is not limited to the touch panel. For example, various operation buttons, a keyboard, a pointing device, and the like may be provided as the operation unit 91.

In the present embodiment, the user can select a nail design to be printed on the nail by operating the operation unit 91.

The touch panel configured in the display 92 displays various display screens under the control of a controller 96 to be described later.

In the present embodiment, the display 92 can display a nail design which was input or selected by the user from the operation unit 91, an image which was transmitted from the nail printing device 1, and the like.

The communication unit 94 can transmit printing data to the nail printing device 1. Furthermore, when data such as a nail image is transmitted from the nail printing device 1, the communication unit 94 receives the transmitted data. The communication unit 94 includes a wireless communication module that can communicate with the communication unit 55 of the nail printing device 1.

The communication unit 94 may be any communication unit as long as the communication unit can communicate with the nail printing device 1, and a communication unit that meets the communication standard of the communication unit 55 of the nail printing device 1 is applied as the communication unit 94.

The control device 95 is a computer that includes: a controller 96 configured by including a CPU (Central Processing Unit) not shown in the drawings; and a storage 97 configured by including a ROM (Read Only Memory) and a RAM (Random Access Memory) not shown in the drawings.

The storage 97 stores various types of data and programs for operating the components of the terminal device 9.

Specifically, the ROM or the like in the present embodiment stores various programs such as a nail print application program for performing nail printing using the nail printing device 1 in addition to an operation program for controlling the components of the terminal device 9 in an integrated manner. The control device 95 expands these programs in a working area of the RAM and executes the programs, for example, so that the terminal device 9 is controlled.

The data of nail designs, information on nail images and nail shapes, and the like are stored in the storage 97 of the present embodiment.

The controller 96 controls the operations of respective components of the terminal device 9 in an integrated manner. The controller 96 implements various functions for performing printing on the nail in cooperation with a program stored in the storage 97.

Next, the operation of nail printing device 1 when executing printing on the nail will be described.

Figure 3:
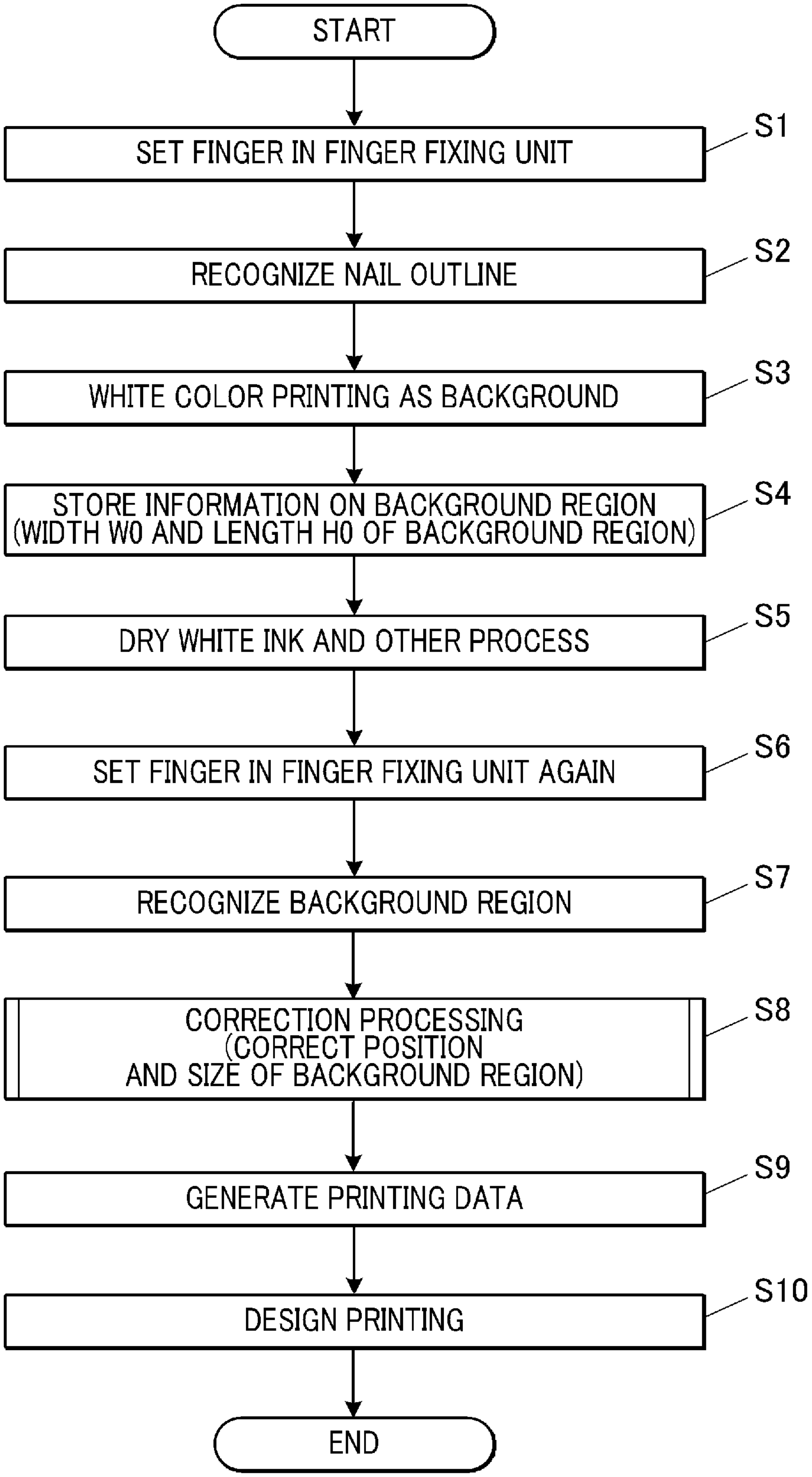
FIG. 3 is a flowchart showing the flow of printing processing in the embodiment.
Figure 4A:
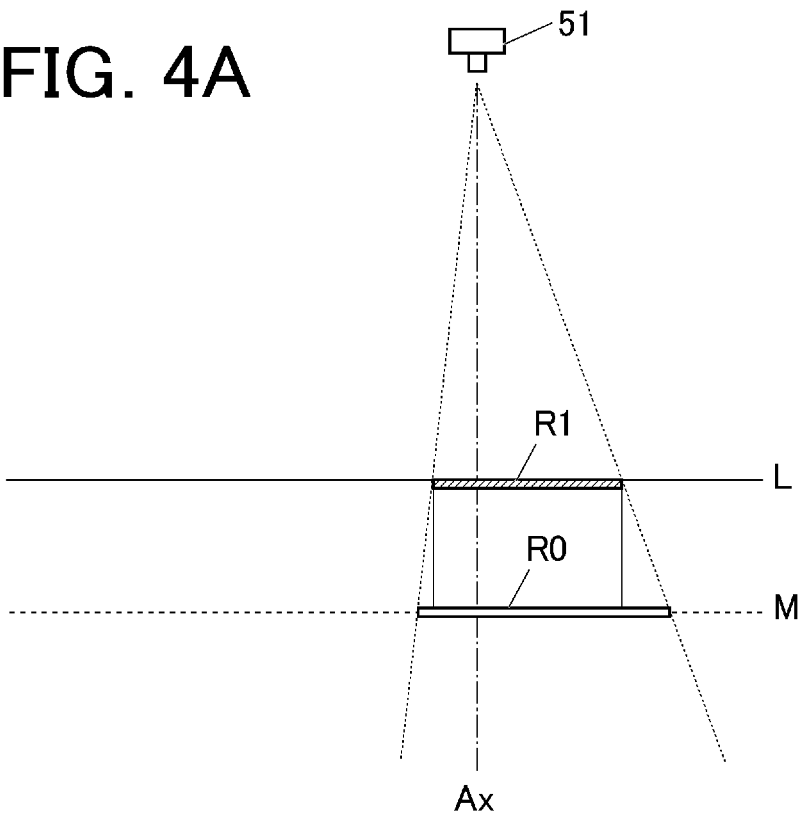
FIG. 4A is a view for explaining the influence of positional deviation of a nail from a reference plane of an photographing device.
Figure 4B:
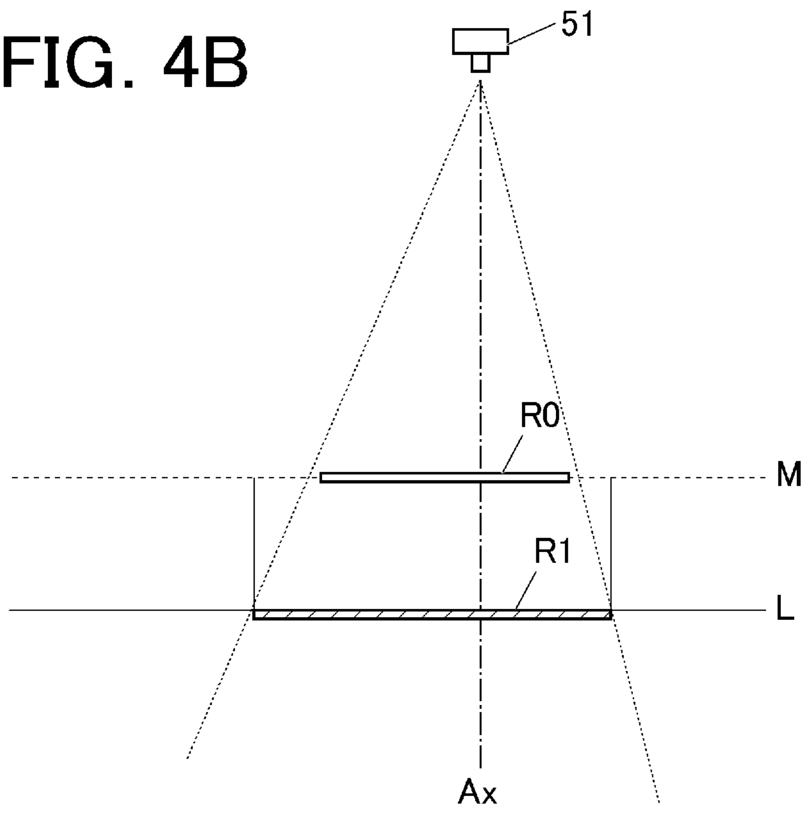
FIG. 4B is a view for explaining the influence of positional deviation of the nail from the reference plane of the photographing device.

FIG. 3 is a flowchart showing the flow of printing processing of the nail printing device 1. Each of FIGS. 4A and 4B is a view for explaining the influence of positional deviation of the nail from the reference plane L of the photographing device 51.

The nail design to be printed is set in advance in the embodiment.

As shown in FIG. 3, when the printing processing is executed and the user places a finger (printing finger) in the finger fixing unit 6 (step S1), the controller 81 obtains a nail image by photographing the nail of the printing finger with the photographing unit 50, recognizes (detects) the nail shape (nail region) from this nail image and stores the recognized nail shape (nail region) in the storage 82 (step S2).

The controller 81 then executes white color printing of printing the background paint of white color (white ink) on the printing finger placed in the finger fixing unit 6 (step S3). In the embodiment, the white color printing is executed by the printing unit 40 on the printing region (region to apply the nail design) which is set in advance in the nail region which was recognized (detected) in step S2. This white color printing (background) is an example of a preceding print according to the present disclosure. The range of background region to apply the white color printing is not particularly limited. The range of background region to apply white color printing may be a part of the nail, may be the entire nail, or may not one-to-one correspond to the detected nail region.

The controller 81 stores, in the storage 82, the information on the background region which was actually printed (step S4). In the present embodiment, the X-direction width W0 and the Y-direction length H0 (see FIG. 6) of the circumscribed quadrangle of the background region are stored. The circumscribed quadrangle is formed by the sides along the X direction and the Y direction.

Thereafter, the printing finger is removed from the finger fixing unit 6 by the user, and drying of the white ink and application of an accepting layer for color inks onto the white ink are performed as needed (step S5).

When the printing finger is placed in the finger fixing unit 6 by the user again (step S6), the controller 81 obtains the nail image by photographing the nail of the printing finger with the photographing unit 50 (photographing device 51), recognizes (detects) the background region of white color from this nail image, and stores the recognized background region in the storage 82 (step S7).

When the position of the nail which was placed again in step S6 after the white color printing is vertically deviated from the reference plane L which allows obtaining the accurate size by the photographing device 51, the background region (hereinafter, referred to as "recognized region R1") which was recognized (detected) in step S7 is recognized (detected) in the state changed from the actual background region (hereinafter, referred to as "actual region R0") by the amount of distance deviated from the reference plane L. The actual region R0 is an example of a preceding print setting region according to the present disclosure, and the recognized region R1 is an example of a succeeding print region according to the present disclosure.

To be specific, as shown in FIG. 4A, when the nail position M (position on the optical axis Ax) is lower than the reference plane L (farther from the photographing device 51), the recognized region R1 becomes smaller than the actual region R0. Thus, when printing is performed for the range of the recognized region R1, the white portion is left in end portions of the actual region R0.

On the other hand, as shown in FIG. 4B, when the nail position M is upper than the reference plane L (closer to the photographing device 51), the recognized region R1 becomes larger than the actual region R0. Thus, when printing is performed for the range of the recognized region R1, this printed region protrudes from the actual region R0.

The controller 81 performs correction processing of correcting the position and the size of the background region which was recognized in step S7 (step S8).

Figure 5:
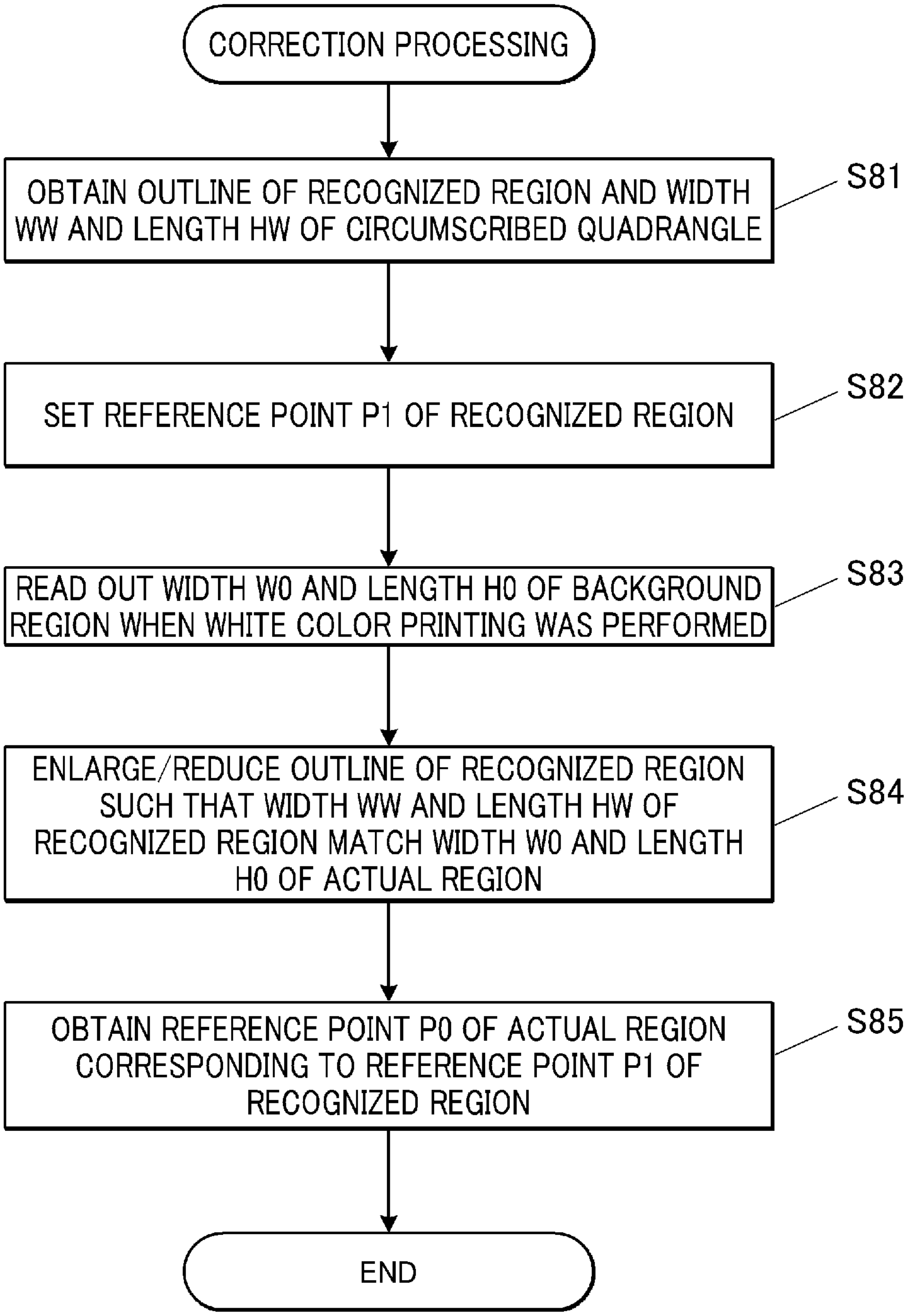
FIG. 5 is a flowchart showing the flow of correction processing in the embodiment.
Figure 6:
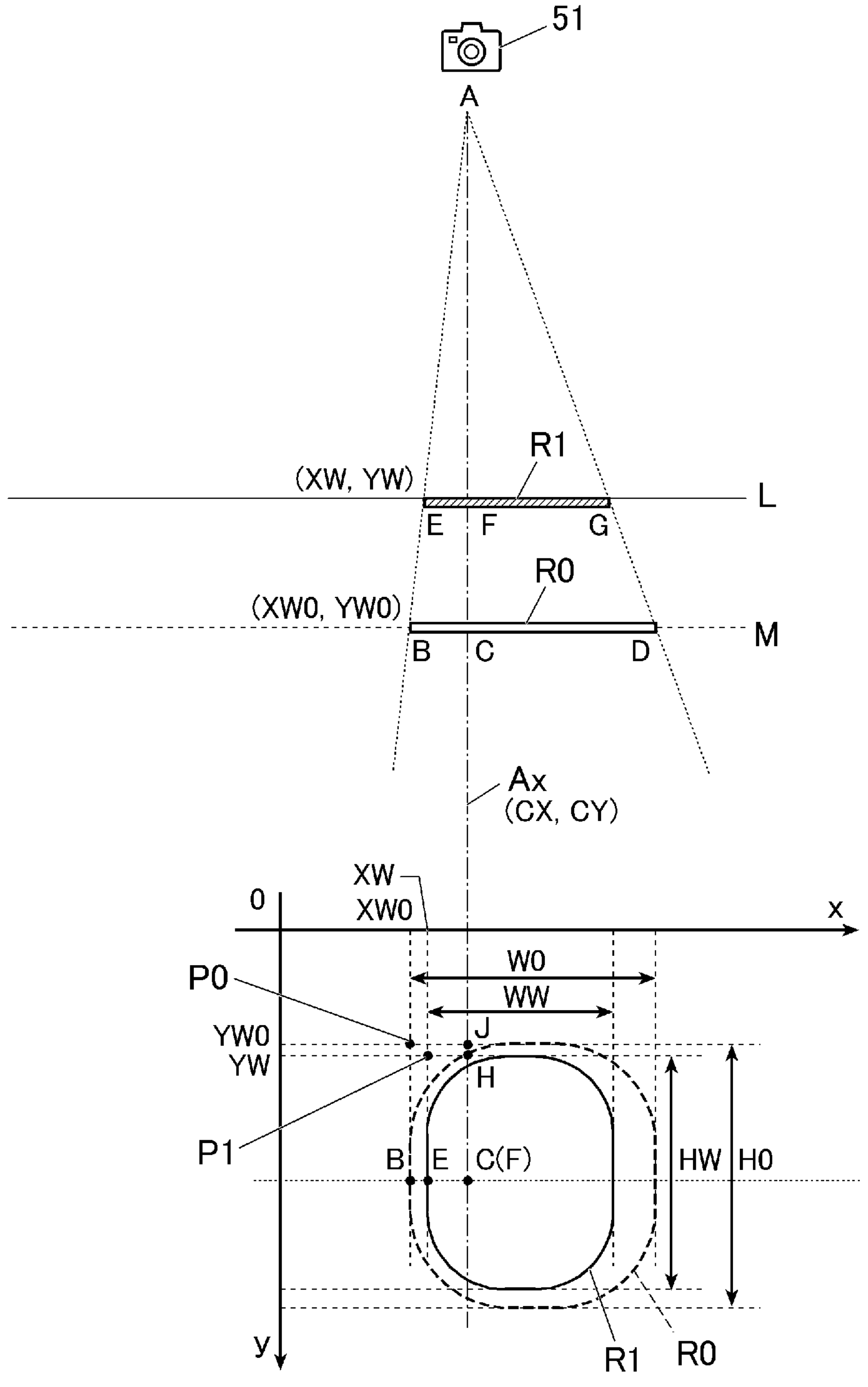
FIG. 6 is a view for explaining an example of the correction processing in the embodiment.

FIG. 5 is a flowchart showing the flow of this correction processing. FIG. 6 is a view for explaining this correction processing.

FIG. 6 illustrates a case where the position M of the nail which was placed again in step S6 after the white color printing is lower (farther) than the reference line L of the photographing device 51.

In the following description, except where specifically noted, "distance" indicates the distance along the optical axis Ax, "width" indicates the distance along the X direction, "length" indicates the distance along the Y direction, and "coordinates" indicate the XY coordinates.

As shown in FIGS. 5 and 6, when the correction processing is performed, the controller 81 first obtains the coordinates of the outline of the recognized region R1 and the X-direction width WW and the Y-direction length HW of its circumscribed quadrangle (step S81). The circumscribed quadrangle is formed by the sides along the X direction and the Y direction.

Next, the controller 81 sets the coordinates of a reference point P1 of the recognized region R1 (step S82). The reference point P1 is an example of a succeeding print region reference point according to the present disclosure. In the present embodiment, this reference point P1 is any one vertex (XW, YW) of the circumscribed quadrangle (having respective sides along X and Y) of the recognized region R1 on the X-Y plane. However, the reference point P1 is not limited to the reference point P1 in the present embodiment as long as the reference point P1 is a point (for example, representative point) corresponding to a circumscribed polygon of the recognized region R1. The reference point P1 may be a center of gravity (center of the figure) of the circumscribed polygon of the recognized region R1, for example.

Next, the controller 81 reads out the X-direction width W0 and the Y-direction length H0 of the background region stored in step S4 (step S83). The X-direction width W0 and the Y-direction length H0 are equal to the X-direction width and the Y-direction length of the actual region R0 since the X-direction width W0 and the Y-direction length H0 are actual sizes when the white color printing was performed.

The controller 81 then enlarges/reduces the outline of the recognized region R1 such that the X-direction width WW and the Y-direction length HW of the recognized region R1 match the X-direction width W0 and the Y-direction length H0 of the actual region R0 (step S84).

That is, in order to obtain the point B on the outline of the actual region R0, for example, the X-direction length BC may be obtained from the following formula:

$$BC=EF\times W0/WW$$

The EF is known from the point E on the circumscribed quadrangle of the recognized region R1 and the point F on the optical axis Ax.

Similarly, in order to obtain the point J on the outline of the actual region R0, the Y-direction length JC may be obtained from the following formula:

$$JC=HF\times H0/HW$$

The HF is known from the point H on the circumscribed quadrangle of the recognized region R1 and the point F on the optical axis Ax.

The controller 81 obtains the reference point P0 of the actual region R0 corresponding to the reference point P1 of the recognized region R1 (step S85). The reference point P0 is an example of a preceding print setting region reference point according to the present disclosure.

The coordinates (XW0, YW0) of the reference point P0 of the actual region R0 are calculated by the following formula:

$$XW0=CX-\text{length } BC=CX-\text{length } EF\times W0/WW=CX-(CX-XW)\times W0/WW$$

$$YW0=CY-\text{length } JC=CY-\text{length } HF\times W0/WW=CY-(CY-YW)\times W0/WW$$

In such a way, the recognized region R1 is corrected to the region having the outline which was enlarged or reduced in step S84 and the reference point P0 (XW0, YW0) calculated in step S85, that is, the actual region R0. Thus, it is possible to properly perform design printing to the actual background region.

As shown in FIG. 3, the controller 81 generates printing data to execute predetermined design printing to the background region (recognized region R1) which was corrected in step S8 (step S9).

Thereafter, the controller 81 executes design printing (printing of decoration) by the printing unit 40 on the basis of the printing data generated in step S9 (step S10), and then ends the printing processing. This design printing (decoration) is an example of a succeeding print according to the present disclosure.

As descried above, according to the present embodiment, the background region is recognized from the image obtained by photographing the printing finger, the reference point P1 of this recognized region R1 and the reference point P0 of the actual region R0 are set, and the decoration is printed on the nail region on the basis of the information on the reference points and the actual region R0.

Thus, even when the nail position M is deviated from the reference plane L which allows to obtain the accurate size by the photographing device 51, the recognized region R1 can be corrected to the region having the reference point P0 and the size corresponding to the actual region R0. Thus, it is possible to make the printing region to apply design printing match the background region, and finish the nail as a nice-looking nail.

A first modification example of the above embodiment will be described.

The first modification example is mainly different from the above embodiment in the contents of correction processing in step S8 correcting the recognized background region. Hereinafter, this difference will be mainly described, and same reference numerals are provided to the same components as those of the above embodiment to omit the explanation thereof.

Figure 7:
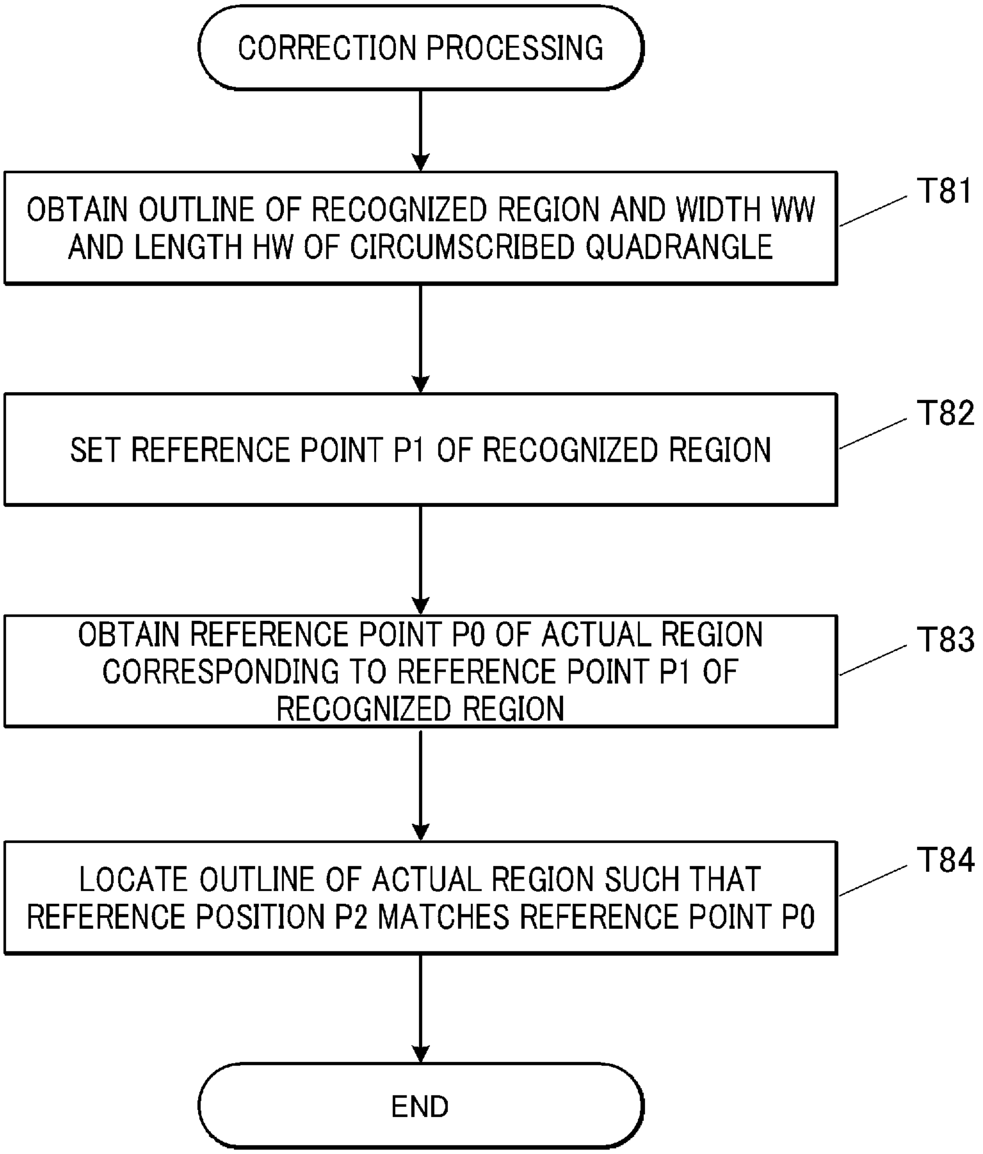
FIG. 7 is a flowchart showing the flow of correction processing in a first modification example of the embodiment.

FIG. 7 is a flowchart showing the flow of correction processing in the first modification example. Each of FIGS. 8A and 8B is a view for explaining this correction processing.

Figure 8A:
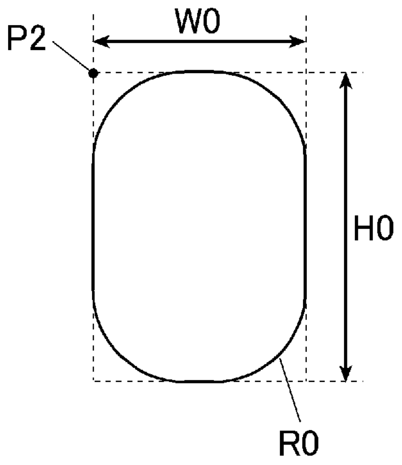
FIG. 8A is a view for explaining the correction processing in the first modification example of the embodiment.

In the first modification example, as shown in FIG. 8A, the controller 81 obtains the coordinates of the outline of background region in addition to the X-direction width W0 and the Y-direction length H0 of the circumscribed quadrangle of the background region as the information on the background region which was actually printed (that is, actual region R0), and stores them in the storage 82 in step S4.

Figure 8B:
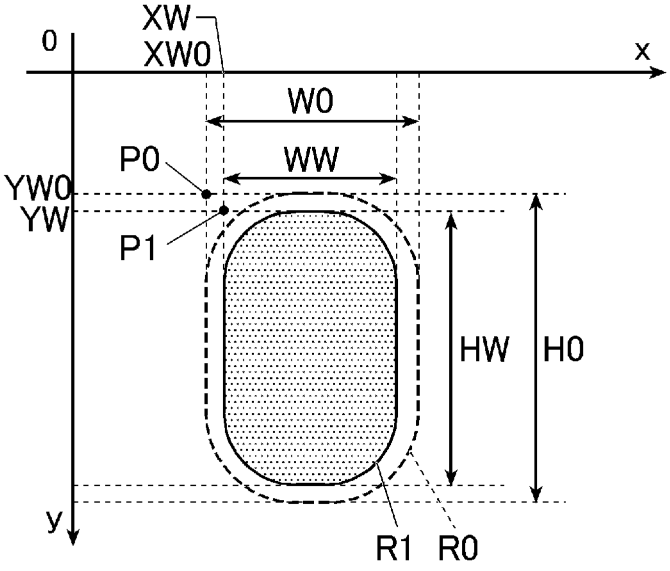
FIG. 8B is a view for explaining the correction processing in the first modification example of the embodiment.

Thereafter, when the correction processing is executed, as shown in FIGS. 7 and 8B, the controller 81 first obtains the coordinates of the outline of the recognized region R1 and the X-direction width WW and the Y-direction length HW of its circumscribed quadrangle, similarly to step S81 of the above embodiment (step T81).

The controller 81 sets the coordinates of the reference point P1 of the recognized region R1, similarly to step S82 of the above embodiment (step T82).

Next, the controller 81 obtains the reference point P0 of the actual region R0 corresponding to the reference point P1 of the recognized region R1, similarly to step S85 of the above embodiment (step T83).

The controller 81 then locates the outline of the background region (that is, actual region R0) obtained in step S4 such that the reference position P2 (see FIG. 8A) matches the reference point P0 (step T84). The reference position P2 is a point in the actual region R0, the point being in the positional relationship corresponding to the reference point P1 in the recognized region R1. In the example of FIG. 8A, the reference position P2 is the upper left vertex of the circumscribed quadrangle. The reference position P2 may be obtained in step T84, or may be obtained in step S4 in advance.

In such a way, the recognized region R1 is corrected to the actual region R0 having the outline obtained in step S4 and the reference point P0 calculated in step T83. Thus, it is possible to properly perform design printing on the actual background region.

As described above, the effect similar to that of the embodiment is obtained by the first modification example.

That is, even when the nail position M is deviated from the reference plane L which allows to obtain the accurate size by the photographing device 51, the recognized region R1 can be corrected to the region having the reference point P0 and the size (outline) corresponding to the actual region R0. Thus, it is possible to make the printing region of design printing match the background region and finish the nail as a nice-looking nail.

Furthermore, according to the first modification example, the actual region R0 is set by locating the outline of background region while making the reference position P2 match the reference point P0. Accordingly, it is possible to reduce the calculation processing amount compared to the case of setting the actual region R0 by enlarging/reducing the recognized region R1.

A second modification example of the above embodiment will be described.

The second modification example is mainly different from the above embodiment in the contents of correction processing in step S8 correcting the recognized background region. To be specific, in the above embodiment, the decoration is printed by setting the reference point P1 of the recognized region R1 and the reference point P0 of the actual region R0. However, instead of this, in the second modification example, the decoration is printed by setting only the reference point P1 of the recognized region R1, without setting the reference point P0 of the actual region R0. Hereinafter, this difference will be mainly described, and same reference numerals are provided to the same components as those of the above embodiment to omit the explanation thereof.

Figure 9:
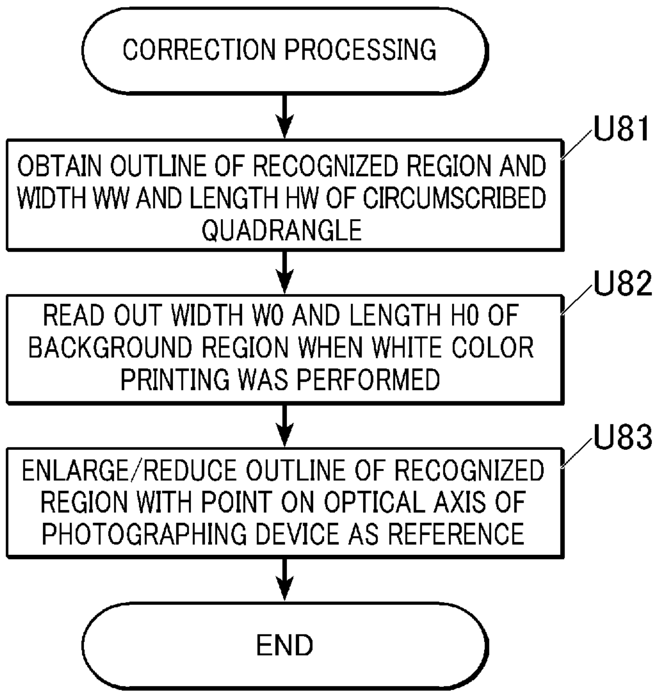
FIG. 9 is a flowchart showing the flow of correction processing in a second modification example of the embodiment.
Figure 10:
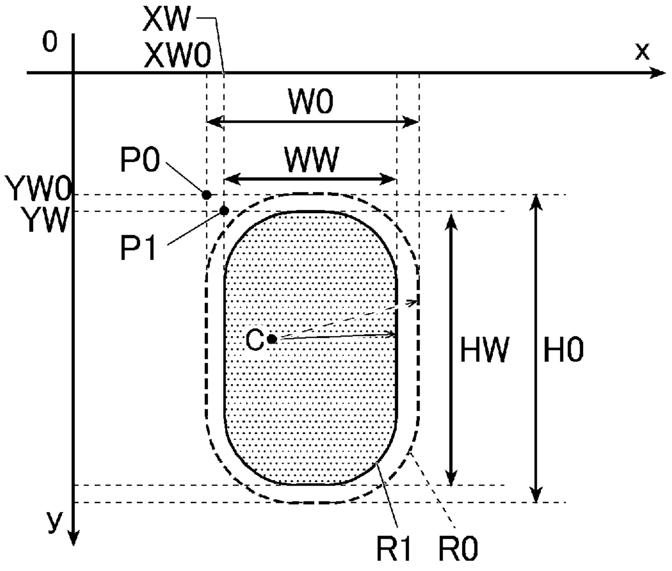
FIG. 10 is a view for explaining the correction processing in the second modification example of the embodiment.

FIG. 9 is a flowchart showing the flow of correction processing in the second modification example. FIG. 10 is a view for explaining this correction processing.

When the correction processing is executed, as shown in FIGS. 9 and 10, the controller 81 first obtains the coordinates of the outline of the recognized region R1 and the X-direction width WW and the Y-direction length HW of its circumscribed quadrangle, similarly to step S81 of the above embodiment (step U81).

The controller 81 then reads out the X-direction width W0 and the Y-direction length H0 of the background region (that is, actual region R0) which were stored in step S4, similarly to step S83 of the above embodiment (step U82).

The controller 81 enlarges/reduces the outline of the recognized region R1 such that the X-direction width WW and the Y-direction length HW of the recognized region R1 match the X-direction width W0 and the Y-direction length H0 of the actual region R0 (step U83).

At this time, the controller 81 sets the point C (CX, CY) on the optical axis Ax, that is, the intersection of the recognized region R1 and the optical axis Ax as a reference point P1, and enlarges/reduces the relative position of the outline of the recognized region R1 with respect to the reference point P1. The enlargement or reduction rate may be W0/WW or H0/HW, may be an average value thereof, or may be W0/WW in the width direction and H0/HW in the length direction.

In such a way, the recognized region R1 is corrected to the actual region R0 having the outline which was enlarged or reduced in step U83 and the reference point on the optical axis Ax (equal to the reference point P1 since it is the point on the optical axis Ax). Thus, it is possible to properly perform design printing on the actual background region.

As described above, the similar effect to that of the embodiment is obtained by the second modification example.

That is, the background region is recognized from the image obtained by photographing the printing finger, the reference point P1 of this recognized region R1 is set, and the decoration is printed on the nail region on the basis of the information on this reference point P1 and the actual region R0.

Thus, even when the nail position M is deviated from the reference plane L which allows to obtain the accurate size by the photographing device 51, the recognized region R1 can be corrected to the region having the reference point and the size (outline) corresponding to the actual region R0. Thus, it is possible to make the printing region of design printing match the background region and finish the nail as a nice-looking nail.

Though the embodiment of the present disclosure has been described above, the present disclosure is not limited to the embodiment, and various modifications can be made within the scope of the present disclosure.

Figure 11:
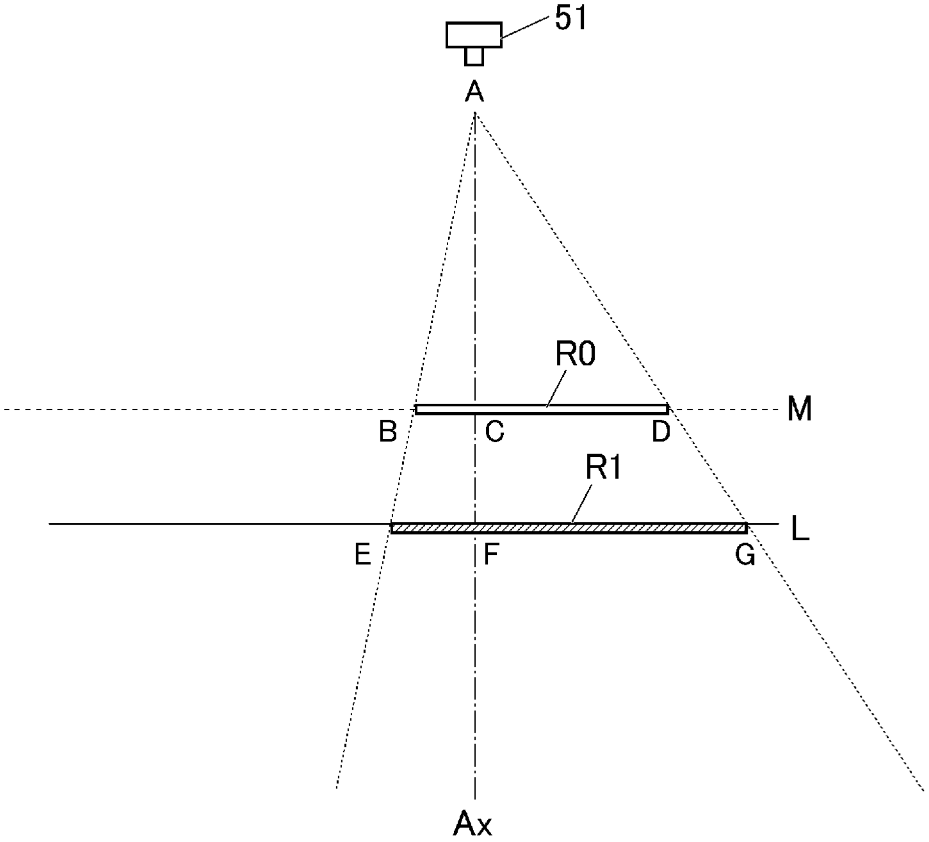
FIG. 11 is a view for explaining another example of the correction processing in the embodiment.

For example, the embodiment and its modification examples takes, as an example, a case where the nail position M is located lower than the reference plane L in the correction processing of step S8. However, as shown in FIG. 11, the correction processing can be executed similarly in a case where the nail position M is upper than the reference plane L (closer to the photographing device 51).

The background may be in a color other than the white color.

In the present embodiment, the nail printing device 1 performs printing by the inkjet method. However, the method of performing printing by the nail printing device 1 is not limited to the inkjet method.

For example, printing may be performed with a pen by providing a pen holder that holds the pen for printing which performs printing with the pen tip contacting the nail surface. There may be provided both of the inkjet type printing unit as in the present embodiment and the pen holder holding the pen for printing so as to perform printing by using multiple printing units.

In the present embodiment, the background is printed as a preceding print, and the decoration is printed as a succeeding print. However, the preceding print and succeeding print according to the present disclosure are not limited to this embodiment. For example, both of the preceding print and the succeeding print may be the background (first background and second background), or both of the preceding print and the succeeding print may be the decoration (first decoration and second decoration).

The present embodiment takes, as an example, a case where the printing system is formed in the cooperation between the nail printing device 1 and the terminal device 9, the inputting of the printing start instruction and the like are performed on the terminal device 9 side, and then the printing operation is executed on the nail printing device 1 side. However, the nail printing device 1 is not limited to this case.

For example, the operation unit and display to input various instructions, the printing data generating unit to generate printing data and the like may be provided on the nail printing device 1 side so that the control device of the nail printing device 1 may perform these processes. In such a case, it is possible to configure such that the nail printing device 1 can complete the printing operation alone without cooperating with the terminal device.

The various types of data such as nail designs, image data obtained by photographing, and printing inclination setting table may be stored in the storage of the terminal device, or may be stored in the storage of the nail printing device 1.

The various types of data may be stored in a server device or the like which can be connected via a network line or the like so that the terminal device or the nail printing device 1 can access the server device or the like to refer to this data.

By such a configuration, it is possible to select a design to be printed from among more nail designs.

Although several embodiments of the present disclosure have been described, the scope of the present disclosure is not limited to the above described embodiments and includes the scope of the present disclosure that is described in the claims and the equivalents thereof.

What is claimed is:

1. A printing device comprising:

a camera for capturing an image of a printing target;

at least one processor; and a print head, wherein the processor obtains information pertaining to a size of a preceding print region that is recorded in a case where preceding printing is performed on the printing target, sets a position and a size of the preceding print region detected from the image captured by the camera of the printing target on which the preceding printing is performed, as a position and a size of a succeeding print region on which succeeding printing is to be performed, sets a first reference point in the set, succeeding print region, sets a second reference point in the preceding print region for which the information pertaining to the size is obtained, and corrects the succeeding print region based on a position of the first reference point and a position of the second reference point, and the print head performs the succeeding printing on the corrected, succeeding print region.

2. The printing device according to claim 1, wherein the processor performs correction to enlarge or reduce a size of the succeeding print region that is set, such that the size of the succeeding print region matches the size of the preceding print region that is obtained, in response to the size of the preceding print region not matching the size of the succeeding print region, sets the position of the second reference point, based on the position of the succeeding print region that is set and an enlargement rate or a reduction rate of the succeeding print region that is corrected, and corrects the succeeding print region such that the position of the second reference point matches the position of the first reference point.

3. The printing device according to claim 1, wherein the first reference point is a predetermined vertex of a circumscribed quadrangle of the succeeding print region that is set, and the second reference point is a predetermined vertex of a circumscribed quadrangle of the preceding print region that is obtained.

4. The printing device according to claim 1, wherein the processor obtains the information pertaining to the size of the preceding print region from the image of the printing target located on a predetermined reference plane that is photographed with the camera.

5. A printing device comprising:

at least one processor that detects a nail region based on an image obtained by photographing a finger or a toe to be a printing target; and a print head that performs preceding printing on the detected, nail region, wherein the processor sets a succeeding print region corresponding to a preceding print setting region that is a region where the preceding printing is performed, sets a first reference point in the set, succeeding print region, obtains, in the preceding print setting region, a second reference point corresponding to the set, first reference point, and corrects the succeeding print region based on a position of the first reference point and a position of the second reference point, and the print head performs succeeding printing on the corrected, succeeding print region.

6. A printing method comprising:

obtaining information pertaining to a size of a preceding print region that is recorded in a case where preceding printing is performed on a printing target;

setting a position and a size of the preceding print region detected from an image captured by a camera of the printing target on which the preceding printing is performed, as a position and a size of a succeeding print region on which succeeding printing is to be performed;

setting a first reference point in the set, succeeding print region;

setting a second reference point in the preceding print region for which the information pertaining to the size is obtained;

correcting the succeeding print region based on a position of the first reference point and a position of the second reference point; and performing the succeeding printing on the corrected, succeeding print region.

7. The printing method according to claim 6, wherein the succeeding print region is corrected by performing correction to enlarge or reduce a size of the set, succeeding print region, such that the size of the succeeding print region matches the obtained size of the preceding print region, in response to the size of the preceding print region not matching the size of the succeeding print region, setting the second reference point includes setting the position of the second reference point, based on the position of the set, succeeding print region and an enlargement rate or a reduction rate of the corrected, succeeding print region, and the succeeding print region is corrected such that the position of the second reference point matches the position of the first reference point.

8. The printing method according to claim 6, wherein the first reference point is a predetermined vertex of a circumscribed quadrangle of the set, succeeding print region, and the second reference point is a predetermined vertex of a circumscribed quadrangle of the obtained, preceding print region.

9. The printing method according to claim 6, wherein the information pertaining to the size of the preceding print region is obtained by obtaining the information from the image of the printing target located on a predetermined reference plane that is photographed with the camera.

10. A non-transitory computer readable storage medium storing a program for a printing device that includes a camera for capturing an image of a printing target and a print head, the program causing a computer of the printing device to obtain information pertaining to a size of a preceding print region that is recorded in a case where preceding printing is performed on the printing target, set a position and a size of the preceding print region detected from the image captured by the camera of the printing target on which the preceding printing is performed, as a position and a size of a succeeding print region on which succeeding printing is to be performed, set a first reference point in the set, succeeding print region, set a second reference point in the preceding print region for which the information pertaining to the size is obtained, correct the succeeding print region based on a position of the first reference point and a position of the second reference point, and perform the succeeding printing with the print head on the corrected, succeeding print region.

11. The non-transitory computer readable storage medium according to claim 10, wherein the succeeding print region is corrected by performing correction to enlarge or reduce a size of the set, succeeding print region, such that the size of the succeeding print region matches the obtained size of the preceding print region, in response to the size of the preceding print region not matching the size of the succeeding print region, the second reference point is set based on the position of the set, succeeding print region and an enlargement rate or a reduction rate of the corrected, succeeding print region, and the succeeding print region is corrected such that the position of the second reference point matches the position of the first reference point.

12. The non-transitory computer readable storage medium according to claim 10, wherein the first reference point is a predetermined vertex of a circumscribed quadrangle of the set, succeeding print region, and the second reference point is a predetermined vertex of a circumscribed quadrangle of the obtained, preceding print region.

13. The non-transitory computer readable storage medium according to claim 10, wherein the information pertaining to the size of the preceding print region is obtained by obtaining the information from the image of the printing target located on a predetermined reference plane that is photographed with the camera.

* * * * *